3,218,182
PREPARATION OF SUBMICROSCOPIC HIGH
SURFACE AREA INORGANIC PRODUCTS
FROM OXIDE MINERALS
Glen A. Hemstock, East Brunswick, and Robert J. Bergmann, Irvington, N.J., assignors to Minerals & Chemicals Philipp Corporation, Menlo Park, N.J., a corporation of Maryland
No Drawing. Filed Jan. 14, 1963, Ser. No. 251,052
8 Claims. (Cl. 106—288)

This invention relates generally to the processing of hydrated crystalline oxide minerals and is directed especially to the conversion of nonmetallic oxide minerals into products having unique and valuable physical characteristics not possessed by the minerals themselves.

Prior art attempts to elucidate the structure of certain nonmetallic hydrated crystalline minerals have entailed the prolonged dry grinding of the minerals until the crystal lattice of the minerals was destroyed. One group of minerals which has been subjected to prolonged dry grinding includes the koalin clay minerals. These are hydrated crystalline aluminum silicate minerals consisting of alternating silica and gibbsite $(Al(yH)O_3)$ layers or sheets (See an article by Takahashi entitled, "Effect of Dry Grinding on Kaolin Minerals," Clay and Clay Minerals Proceedings of the 6th National Conference on Clays and Clay Minerals, pages 278–291 (1959).) Other minerals which have been subjected to prolonged dry grinding are serpentine minerals, i.e., brucite, which is a hydrated magnesium oxide, and chrysotile, a hydrated magnesium silicate mineral which is composed of alternating sheets of silica and brucite. (See an article by Edward Martinez entitled, "The Effect of Particle Size on the Thermal Properties of Serpentine Minerals," The American Mineralogist, vol. 46, July-August 1961.) These attempts were academic in nature and the ground products obtained by destruction of the crystal lattice of the various hydrated nonmetallic oxide minerals were of no apparent utility. Insofar as we are aware, no attempts have been made to obtain commercially valuable products from them.

We have discovered that crystalline minerals containing gibbsite or brucite as an exposed (surface) layer can be readily transformed by a combination of steps, including a dry grinding step, into products having valuable properties not possessed by the original minerals or by the minerals after being dry ground in accordance with the teachings of the prior art.

An object of this invention is the provision of a simple method for processing abundant naturally occurring minerals containing a brucite layer or a gibbsite layer to obtain products having characteristics usually possessed only by inorganic materials obtained by expensive precipitation or polymerization techniques.

A more particular object of this invention is the provision of a method for converting micron size minerals containing an exposed gibbsite or brucite layer into submicron size products which have an extremely large specific surface as compared with the parent mineral.

Another object of this invention is the preparation of novel inorganic filler or pigment material.

A more specific object of this invention is to destroy the crystal structure of a mineral containing an exposed gibbsite or brucite sheet and to subject the mineral thus processed to hydrothermal treatment so as to obtain extremely finely divided uniform particles having a very high surface area.

Stated briefly, in accordance with this invention a dried mass of a layered crystalline hydrated nonmetallic oxide mineral having not more than two layers and containing a material selected from the group consisting of gibbsite and brucite as an exposed layer, the other layer being silica in the case that the mineral is a two-layered mineral, is dry ground for a time sufficient to effect the destruction of the crystal lattice of a substantial portion, and preferably all, of the mass of the mineral. The mass of mineral thus ground is then mixed with water and the aqueous mixture is subjected to the action of high pressure saturated steam at a pressure below the critical pressure of water until a material having a surface area of at least 100 m.$^2$/g. is obtained.

While not wishing to be bound to any theory or hypothesis as to precise mechanism involved, it is believed that the following would explain how micron-sized, low surface area layered minerals of the type described above are converted by dry grinding and hydrothermal treatment into extremely high surface area materials of uniform submicron particle dimensions. As is known and is discussed in the literature reference mentioned above, prolonged dry grinding of koalin minerals and serpentine minerals reduces the particle size of these minerals and lowers and broadens the endothermic peak which corresponds to loss of water of crystallization and is characteristic of the mineral. In other words, prolonged dry grinding shifts the temperature at which these minerals dehydroxylate. Hydrothermal treatment of the ground minerals in the presence of liquid water is believed to effect a controlled partial dehydroxylation with an accompanying shattering and reorientation of the particles, resulting in the formation of extremely fine hydrated oxide particles having an extensive exposed surface, internal or external.

Species of minerals to which the process of the present invention is applicable include: gibbsite, a single layer alumina trihydrate; koalinite, anauxite, dickite, nacrite and halloysite (including the di- and tetra-hydrate forms of halloysite, all of the aforementioned being two-layered hydrated aluminum silicates of the formula $Al_2O_3.2SiO_2.2-4H_2O$ and containing alternating gibbsite add silica sheets; brucite, a single layer hydrated magnesia; and chrysotile, a two-layered asbestos mineral of the approximate formula $3MgO.2SiO_2.2H_2O$. As mentioned chrysotile contains alternating layers of brucite and silica and it is the magnesium analogue of koalinite. It is also within the scope of this invention to employ mixtures of two or more of the above-mentioned minerals to obtain products of the desired chemical and/or physical characteristics. By way of illustration, mixtures of kaolin clay and chrysotile asbestos can be used. The pure form of the mineral can be employed or, if desired, an ore containing the mineral as the predominating mineral constituent can be used. For example, a bauxite ore can be used as the source of gibbsite.

The desired results are not obtained with three-layered minerals, such as attauplgite and pyrophyllite which contain a gibbsite or brucite sheet as a central layer. While several minerals outside the scope of this invention can be decomposed by prolonged dry grinding, the ground materials are not converted into high surface area products by subsequent hydrothermal treatment as are the one or two-layered minerals mentioned above.

In putting this invention into practice, it is essential to employ the gibbsite or brucite-containing mineral in hydrated crystalline form. In other words, the mineral should not be calcined to the extent that the thermal treatment employed is sufficient to effect the elimination of sufficient lattice water to result in a material which is amorphous in the sense that it does not diffract X-radiation. However, in the case of minerals such as endellitic halloysite, some lattice water is readily eliminated at low temperature and loss of this loosely held water by thermal treatment does not disturb the gibbsite-silica relationship in the mineral. Therefore, endellitic halloysite which has previously been heated to a degree sufficient to eliminate up to about 2 mols of water per mol $Al_2O_3.2SiO_2$ can be employed as a starting material.

In order to put the mineral or ore into the dry, free flowing condition essential for efficient dry grinding, it will frequently be necessary to remove some free moisture from the mineral. Mineral masses containing sufficient free moisture to render the mass plastic or coherent will not respond to dry grinding as will dry, free flowing mineral masses. The term "free moisture" or "F.M." as used herein refers to the weight percentage of a mineral which is eliminated when the mineral is heated to essentially constant weight at a temperature of about 225° F. Generally speaking, the ore should be dried to a free moisture content not to exceed about 2%. Minerals dried to a free moisture below 1% are eminently suitable.

It may be desirable with some dry grinding equipment to subject the mineral to a preliminary crushing and pulverization to mesh size particles, such as particles coarse enough to be retained on a 200-mesh screen and fine enough to be passed through a 20-mesh screen. This preliminary crushing and pulverization can be carried out before or after the drying step.

The mineral is dry ground without addition of water in any apparatus capable of providing the type of grinding action afforded by mortar and pestle grinding. In other words, grinding is carried out by rubbing of mineral crystals against each other while mechanical pressure is applied to the particles. Prolonged dry grinding without application of mechanical pressure, as in a conventional ball mill, is very ineffective for purposes of this invention. Excellent results have been realized by carrying out the dry grinding in a mill provided with sigma blade mixers and with a stationary weighted ram confining the charge in the mill. Fibrous (serpentine) minerals, such as chrysotile and brucite, are more difficult to grind to amorphous condition than kaolin minerals and more work input is required with the fibrous minerals to grind them to amorphous condition. The difficulty in grinding the serpentine minerals can be minimized by employing mixtures of these minerals with the kaolin minerals.

The grinding time employed will depend on the degree of destruction of crystallinity of the mineral mass that is required. The grinding time required to effect the complete destruction of the crystallinity of the mineral charge will vary, for any grinding equipment, with the mineral species that is employed. For economic reasons, it is preferable to grind the charge for only such a period of time as is required to destroy the crystal structure of substantially all of the parent mineral. No apparent benefit is realized by continuing to grind the charge after the crystal structure is completely destroyed. Any of the parent crystals present in the dry ground intermediate product will persist in the hydrothermally treated product as a low surface area, relatively large particle size contaminant. Therefore, the surface area of the hydrothermally treated product will be decreased and the average particle size will be increased in proportion to the quantity of crystalline material remaining in the dry ground intermediate. However, products obtained without effecting the destruction of the crystal structure of all of the mineral charged to the mill may be useful for some applications where an extremely uniform high purity product is not required. If desired, oversized low surface area contaminant in the hydrothermally processed material that results from incomplete destruction of the crystal lattice of the mineral during dry grinding can be separated from the remainder by sedimentation methods known to those skilled in the art.

Grinding time will also vary considerably with the efficiency of the grinding equipment that is employed. For example, an amorphous product was obtained by grinding a substantially pure kaolinite from Georgia for 10 hours under a pressure of about 4 p.s.i. in a sigma blade mixer provided with a ram. Using a continuously operating mechanical mortar and pestle, a 48-hour dry grinding period was required to destroy the crystal structure of the kaolinite.

As is known to those skilled in the art, the extent of crystallinity in the ground material can be determined readily by examining the material by standard X-ray diffraction technique using Cu $K\alpha$ X-radiation. For example, in the case of kaolinite, the 12.5° $2\theta$ line (above background) using Cu $K\alpha$ X-radiation corresponds to the first order basal reflection of kaolinite. The intensity of this line is about 140 units for a well-crystallized kaolinite when 100 units correspond to 640 counts per second. By observing the intensity of the 12.5° $2\theta$ line of dry ground kaolinite, the degree to which the crystal structure of the kaolinite has been destroyed by grinding can be estimated. Similarly, by observing the intensity of the basal reflection lines of other mineral species, the extent of crystal structure can be estimated. In the case of gibbsite, the second order basal reflection line using Cu $K\alpha$ X-radiation, i.e., the 20.3° $2\theta$ line, may be of more value than the first order basal reflection line in estimating destruction of the crystal lattice of the mineral since the first order basal reflection of gibbsite, the 18.3° $2\theta$ line using Cu $K\alpha$ X-radiation is off-scale for the starting material and may be off-scale for material in which a substantial quantity, but not all, of the gibbsite has been destroyed by grinding.

Still another method for ascertaining the extent of crystal destruction is by standard differential thermal analysis technique (DTA) as described in U.S. 2,966,441 to Vander Linden et al. As mentioned, the endotherms of minerals within the scope of this invention are gradually broadened and shifted to lower temperatures as the crystal structure is destroyed by prolonged dry grinding.

The mineral particles after being ground dry to an amorphous condition are finer in particle size than the parent mineral and in most cases have a somewhat higher surface area. Typically, these particles have a diameter of about ½ micron (as determined by measurements made from electron micrographs of the products). Hydrothermal treatment of the dry ground minerals, however, brings about a spectacular increase in surface area and a substantial reduction, e.g., a 50% reduction, in the particle size of the dry ground particle, whereby submicron size particles, similar in size to precipitated filler materials, are obtained. While dry grinding may double or even triple the surface area of the mineral, the surface area of the ground mineral after steam treatment is usually from about 10 to 100 times the surface area of the starting mineral.

In some instances, extremely high surface area products having desirable properties can be obtained by heating the dry ground material at elevated temperature for a time sufficient to eliminate all, or substantially all, volatile matter before subjecting the ground material to hydrothermal treatment. The term "volatile matter" or "V.M." as used herein refers to the weight percentage of a material that is eliminated when the mineral is heated to essentially constant weight at 1800° F. (In the case of minerals to which this invention is applicable, water constitutes substantially all of the volatile matter.) For example, kaolin clay minerals, after being ground to an amorphous condition, can be calcined at a temperature within the range of from about 850° F. to about 1650° F. until the volatile matter is below about 1%. The calcined ground material is then subjected to the action of saturated steam.

The ground mineral is mixed with water before the mineral is subjected to hydrothermal treatment. Sufficient water should be employed to form a slip or slurry of ground mineral having a consistency such that it can be pumped or poured. From about 10 to 50 parts ground mineral to about 90 to 50 parts water are suitable. The slip is subjected to the action of high pressure saturated steam in any equipment provided with means for introducing and controlling pressurized steam.

The saturated steam pressure employed is within the range of about 100 to about 3000 p.s.i.g. Especially recommended are steam pressures within the range of about 400 to 800 p.s.i.g. Steaming time is selected to increase the surface area of the dry ground material to a value of at least 100 m.²/g. Surface area gradually increases with steaming time at any given pressure until a maximum surface area is reached. This maximum may be as high as 400 m.²/g. With further steaming, surface area gradually decreases. A wide range of steaming times may be employed at any given pressure, be as little as a few seconds after pressure is obtained, especially for pressures in excess of 800 p.s.i.g. and may be as much as 24 hours or more, especially at pressures below 400 p.s.i.g. Recommended is the use of saturated steam pressures within the range of 400 to 800 p.s.i.g. for ½ to 12 hours.

The pressure utilized with any given material must obviously be pressure at which a crystalline phase that is desired in the end product is stable. For example, to convert a low surface area gibbsite to a high surface area boehmite (i.e., the form of boehmite described in U.S. 2,915,475 to John Bugosh) by combined dry grinding and hydrothermal treatment, the steam treatment must be at a pressure at which boehmite is the stable alumina phase. In other words, steam pressure is within the range of about 65 to 800 p.s.i.g., preferably 100 to 800 p.s.i.g., to obtain a high surface area hydrated alumina product having the boehmite crystal lattice. Similarly, to convert kaolin clay minerals into novel high surface area aluminum silicates having the X-ray pattern of a kaolin clay mineral (but with a significantly reduced peak intensity), hydrothermal treatment must be carried out at a pressure below which kaolin minerals are decomposed.

With pure minerals, the water of crystallization of the material after the hydrothermal treatment will be less than that of the starting mineral. As shown in the accompanying examples, hydrothermal treatment reduces the water of crystallization by an amount within the range of about 10% to about 60% of the water of crystallization of the starting mineral.

The presence of appreciable quantities of impurities in the minerals may obscure the reduction of water of crystallization which occurs during hydrothermal treatment since the water of crystallization of some impurities may increase during the steam treatment.

The term "water of crystallization" as used herein refers to a value calculated as follows:

$$\text{Percent water of crystallization} = \frac{V.M. - F.M. \times 100}{(100 - F.M.)}$$

The term "V.M." in the equation represents volatile matter and the term "F.M." represents free moisture.

By subjecting suitable crystalline minerals to the process described above, uniform submicron size particles having a surface area of at least 100 m.²/g., more usually surface area well above 200 m.²/g., are obtained from micron size minerals having low surface areas within the range of 1 to 50 m.²/g.

Following are examples of the application of the process of this invention to various crystalline nonmetallic minerals within the scope of this invention.

In the examples which follow, X-ray diffraction studies were carried out by standard procedures using Cu Kα X-radiation (wavelength=1.5405 A.) and 640 counts per second.

Surface areas reported in the examples and referred to elsewhere herein are so-called "B.E.T." values, determined by a nitrogen adsorption method described by S. Brunauer, P. H. Emmett and E. Teller in their article entitled, "Adsorption of Gases in Multi-Molecular Layers," on page 309 of Journal of American Chemical Society, vol. 60, February 1938, using the molecular size data of H. K. Livingston presented in his article entitled, "Cross-Sectional Areas of Molecules Adsorbed on Solid Surfaces," on page 569, Journal of the American Chemical Society, vol. 66, April 1944.

The time values reported in the examples refer to time after the reaction vessel reached the indicated steam pressure.

*Example I*

In accordance with this invention, high surface area hydrated aluminum silicate fillers consisting of substantially uniform submicron size particles were produced from species of kaolin clay in the following manner.

a. *Production of submicron size filler from kaolinite.—* Georgia kaolin clay, consisting of well-crystallized kaolinite having a free moisture content of 0.2%, a water of crystallization of 13.9%, and an average particle size of 0.8 micron, was dry ground in a mixer having two horizontal shafts each provided with a sigma blade (Brabender). A weighted ram was fitted above the blades and contoured to fit the blades. The mixer was closed at the top with a lid and a rod attached to the ram passed through the lid. The mixer was provided with means for cooling the ram and the charge during grinding. The sigma blades were operated at different speeds and the pressure on the clay charge during grinding was about 4 p.s.i.

After a 10-hour grinding period, the clay material had a surface area of 39.3 m.²/g., a water of crystallization of 12.8% and was substantially amorphous, as indicated by an X-ray diffraction pattern of the material.

The ground material, without heat treatment, was agitated in distilled water at ambient temperature to form a 33⅓% solids slip. 15 cc. of the slip were placed in a 50 ml. high silica (Vycor) test tube. The test tube was placed in a 1100 cc. capacity stainless steel bomb to which about 100 ml. of distilled water had been added. The base of the test tube was supported on and maintained in an upright position by the base of the autoclave. After the pressure in the vessel reached 800 p.s.i.g., the contents were maintained under this pressure for 6 hours. (The time required to reach a pressure of 800 p.s.i.g. was about 2½ hours.) The slip, after being allowed to return to ambient temperature, was dried at about 220° F. and pulverized.

The product was found to have a water of crystallization of 10.01%. An X-ray diffraction pattern of the product showed that the first order basal reflection line was at 12.5° 2θ and that the intensity of this line was only 10 units as compared with a 12.5° 2θ first order basal reflection line intensity of 140 units for the starting clay. The surface area of the product was 318 m.²/g. and an electron micrograph showed that substantially all of the particles, which were substantially spherical in form, had diameters within the range of 0.03 to 0.10 micron.

b. *Production of submicron size filler from halloysite.—* The procedure of Example I, Part a, was repeated with an endellitic halloysite (Eureka, Utah) having a water of crystallization of 15.6% and a surface area of 58 m.²/g. After being dry ground with a mechanical mortar and pestle for 48 hours, water of crystallization was 16% and surface area was 56 m.²/g. After hydrothermal treatment at 800 p.s.i.g. water of crystallization was 14.2% and surface area was 191 m.²/g.

*Example II*

Experiments were carried out to demonstrate that combined dry grinding and hydrothermal treatment of kaolin clay are required to produce a high surface area submicroscopic hydrated aluminum silicate product and that the desired results are not obtained with either step employed singly. Experiments were also carried out to demonstrate that the kaolin must be dry ground for a time sufficient to destroy substantially completely the crystal structure of the clay in order to produce a hydrated aluminum silicate filler material of superior quality.

The starting clay used in the experiments was a water-washed, degritted, unfractionated kaolin clay from a mine near McIntyre, Georgia. The clay was composed primarily of well-crystallized kaolinite. Dry grinding was carried out with a mechanical mortar and pestle. Hydrothermal treatment was conducted in the pressurized equipment described in the previous example and with 33⅓% solids aqueous slips.

TABLE I.—EFFECT OF DRY GRINDING AND STEAM TREATMENT ON KAOLINITE

| Dry grinding time, hrs. | Hydrothermal treatment with saturated steam at 800 p.s.i.g., hrs. | Physical state of product | Water of crystallization, percent | Surface area, m.²/g. |
|---|---|---|---|---|
| ---------- | ---------- | Kaolinite (s) | 13.9 | 11.3 |
| ---------- | 6 | Kaolinite (s) | ---------- | 12.3 |
| 24 | ---------- | Kaolinite (w) | ---------- | 36.9 |
| 24 | 6 | Kaolinite (w) | ---------- | 164 |
| 48 | 0 | Amorphous | 16.0 | 34.9 |
| 48 | 1 | Kaolinite (vw) | 12.2 | 338 |
| 48 | 3 | Kaolinite (vw) | 12.4 | 321 |
| 48 | 6 | Kaolinite (vw) | 12.2 | 233 |
| 72 | 0 | Amorphous | 14.4 | 32.7 |
| 72 | 1 | Kaolinite (vw) | 12.0 | 366 |
| 72 | 3 | Kaolinite (vw) | 11.9 | 306 |
| 72 | 6 | Kaolinite (vw) | 11.6 | 330 |
| 72 | 12 | Kaolinite (vw) | 12.0 | 232 | s=strong 12.5° 2θ line, about 140 units.
w=weak 12.5° 2θ line.
vw=very weak 12.5° 2θ line, less than 20 units.

Data in Table I for dry grinding runs without hydrothermal treatment show that, with the particular dry grinding equipment that was employed, grinding increased the surface area of the kaolinite from 11.3 m.²/g. to an optimum value of only 36.9 m.²/g. for a 24-hour grinding period. With further grinding up to 144 hours, surface area decreased but remained somewhat higher than that of the starting clay. These data therefore indicate that dry grinding alone is ineffective in producing a filler material having a surface area comparable with that of commercial precipitated siliceous fillers which have B.E.T. surface areas of at least about 125 m.²/g. Data for runs carried out with dry grinding alone also show that water of crystallization of the clay increased with dry grinding and then leveled off. (With a 144-hour grinding period the water of crystallization of the clay was found to be somewhat less than that of the starting clay.)

Data for the run made with hydrothermal treatment alone show that this treatment had little effect on the surface area of kaolinite that had not undergone a preliminary dry grinding treatment.

Data for runs carried out with combined dry grinding and hydrothermal treatment show that hydrated aluminum silicate products having surface areas above 300 m.²/g. were obtained when the clay was dry ground to an amorphous condition and then subjected to the action of saturated steam for times such that the water of crystallization of the products was within the range of 11.6% to 12.4% and the 12.5° 2θ line of the product was of low intensity. With more prolonged steaming of the ground amorphous clay, materials with lower surface areas and higher intensity 12.5° 2θ lines were obtained.

*Example III*

An English kaolinite (12.6% water of crystallization) was dry ground for 48 hours with the mechanical mortar and pestle, producing a substantially amorphous material having 13.9% water of crystallization. The ground material was slipped to 33⅓% solids and autoclaved with saturated steam at 800 p.s.i.g. for 1 hour as described above. The water of crystallization of the product was 12.9%. The procedure was repeated with a Florida kaolin clay (Putnam) which is a harder clay than Georgia kaolin and has a water of crystallization of 13.5%. The ground autoclaved Florida kaolin had a water of crystallization of 13.3%. The surface area of the autoclaved materials produced from English kaolin and Florida kaolin were 225 m.²/g. and 241 m.²/g., respectively. In each instance, the autoclaved products consisted of uniform particles substantially all of which were finer than 0.1 micron.

*Example IV*

The procedure of Example Ia is repeated with chrysotile asbestos from Canada. The grinding time is increased to 25 hours and the steaming time at 800 p.s.i.g. is reduced to 2 hours.

*Example V*

Crushed brucite ore is dried at 225° F. to a free moisture content below 1%. The dried ore is ground to minus 325 mesh (Tyler) in a hammer mill and charged to a mixer having two horizontal rotatable shafts each provided with a sigma blade and provided with a weighted ram fitted above the blades and contoured to fit the blades. The mixer is closed at the top with a lid and a rod attached to the ram passes through the lid. The dried brucite ore is ground for 20 hours under a pressure of approximately 5 p.s.i. and then mixed with distilled water at ambient temperature, using 20 parts dry ground ore to 80 parts water. The aqueous mixture is placed in an electrically heated autoclave and the autoclave is brought to 600 p.s.i.g. and maintained at this pressure for 6 hours. The slip is dried at 225° F. and pulverized to obtain a high surface area hydrated magnesia product.

*Example VI*

This example is given to illustrate the effect of dry grinding and of hydrothermal treatment on gibbsitic bauxite ore and to demonstrate that these steps must be combined to produce a high surface area boehmite in the form of millimicron size fibers.

Chunks of Surinam bauxite ore (F.M. of 0.04%, V.M. of 33.30%) were mortar and pestle ground by hand to a size (about 100% minus 325 mesh, Tyler) suitable for handling in a mechanical mortar and pestle. The bauxite fines obtained in this manner were placed in an open mechanical mortar and pestle system and ground continuously for 48 hours.

A portion of the ground ore was agitated in water at ambient temperature to form an aqueous slip containing 33⅓% solids, weight basis. Thirty grams of the slip were placed in a 400 ml. high silica (Vycor) beaker. One hundred ml. of distilled water were placed in the bottom of a 1100 cc. capacity autoclave and the beaker containing the slip of ground bauxite was placed upright in the autoclave, being supported above the liquid in the autoclave by the bottom wall of the autoclave. The autoclave was closed and heated to a pressure of 800 p.s.i.g. by heating the vessel electrically. The pressure in the autoclave was maintained at 800 p.s.i.g. for one hour. The time required to heat the autoclave to the desired saturated steam pressure was about 2½ hours. The contents of the autoclave were allowed to cool to room temperature. The autoclaved slip was oven dried at an air temperature of about 220° F.

To evaluate the effect on the ore of hydrothermal treatment alone, a portion of the bauxite fines which had not been ground in the mechanical mortar and pestle were mixed with water to form a 33⅓% solids slip and this slip autoclaved at 800 p.s.i.g. for one hour, as described above. Properties of the intermediate alumina product obtained by dry grinding the bauxite ore were also measured. The results are summarized in Table II.

TABLE II.—EFFECT OF PROLONGED DRY GRINDING AND/OR HYDROTHERMAL TREATMENT ON BAUXITE ORE

| Grinding time, hrs. | Hydrothermal treatment with saturated steam pressure and time | Crystalline phases present (by X-ray diffraction technique) | Appearance under electron microscope | B.E.T. surface area, m.²/g. | Water of crystallization, percent |
|---|---|---|---|---|---|
| None | None | Gibbsite, v.s. (20.30° 2θ line=80 units). | | 1.6 | 33.3 |
| 48 | None | Gibbsite, v.w. (20.30° 2θ line=25 units). | Spherical particles about ½ micron in diameter. | 18.4 | 23.4 |
| None | 800 p.s.i.g./1 hr | Boehmite pattern as given in ASTM diffraction data card 2-0129, v.s. | Large rhombic crystals. | 6.8 | 17.1 |
| 48 | 800 p.s.i.g./1 hr | Modified boehmite pattern having broadened X-ray diffraction lines, as described in U.S. 2,915,495, v.s. | Fibers about 20 to 50 millimicrons in length. | 151 | 16.3 | v.s.=very strong characteristic diffraction maxima.
v.w.=very weak characteristic diffraction maxima.

The data show that hydrothermal treatment alone converted the gibbsite to the usual massive form of boehmite, a low surface area alumina monohydrate in a non-fibrous form.

The data show also that dry grinding destroyed the crystal structure of a major proportion of the gibbsite. From the X-ray diffraction pattern of the ground material it can be estimated that the quantity of gibbsite destroyed was about 69 percent $$\left(\frac{80-25}{80} \text{ units} \times 100\right)$$

The data also show that a substantial quantity of chemical held water was removed during the grinding. From the estimated 31 percent gibbsite content of the ground intermediate and the measured water of crystallization of 23.4 percent for the ground intermediate, it can be concluded that the gibbsite which was destroyed during grinding was converted into a monohydrate.

The data in the table show that a high surface area fibrous boehmite was obtained by dry grinding bauxite ore to destroy most of the gibbsite lattice and then subjecting the ground ore to the action of high pressure saturated steam.

While the preparation of an impure form of fibrous boehmite has been illustrated in this example, a purer form of appreciably higher surface can be obtained from the same bauxite by increasing the grinding time to effect a more complete destruction of the gibbsite crystal lattice.

We claim:
1. A method for producing high surface area submicron size filler material from naturally occurring minerals which comprises:
 subjecting a dry mass of crystalline hydrated oxide mineral to dry grinding until the crystal structure of a substantial portion of said mass of mineral is destroyed, said mineral being selected from the group consisting of kaolinite, anauxite, dickite, nacrite, halloysite, gibbsite, brucite, chrysotile, and mixtures thereof,
 and subjecting the mass of mineral thus ground to the action of saturated steam at superatmospheric pressure below critical pressure for a time sufficient to produce a material having a surface area of at least 100 m.²/g.

2. A method for producing high surface area submicron size filler material from naturally occurring minerals which comprises:
 subjecting a dry mass of crystalline hydrated oxide mineral to dry grinding until the crystal structure of a substantial portion of said mass of mineral is destroyed, said mineral being selected from the group consisting of kaolinite, anauxite, dickite, nacrite, halloysite, gibbsite, rucite, chrysotile, and mixtures thereof,
 and subjecting the mass of mineral thus ground to the action of saturated steam at a pressure within the range of about 100 to about 3000 p.s.i.g. and for a time sufficient to produce a material having a surface area of at least 100 m.²/g.

3. A method for producing high surface area submicron size filler material from naturally occurring minerals which comprises:
 subjecting a dry mass of crystalline hydrated oxide mineral to dry grinding until the crystal structure of a substantial portion of said mass of mineral is destroyed, said mineral being selected from the group consisting of kaolinite, anauxite, dickite, nacrite, halloysite, gibbsite, brucite, chrysotile, and mixtures thereof,
 mixing the ground mass of mineral with water,
 and subjecting the mixture to the action of saturated steam at a pressure within the range of about 100 to about 3000 p.s.i.g. for a time within the range of from a few seconds to 24 hours, said time being sufficient to produce a material having a surface area of at least 100 m.²/g.

4. A method for producing high surface area submicron size filler material from naturally occurring minerals which comprises:
 subjecting a dry mass of crystalline hydrated oxide mineral to dry grinding until the crystal structure of a substantial portion of said mass of mineral is destroyed, said mineral being selected from the group consisting of kaolinite, anauxite, dickite, nacrite, halloysite, gibbsite, brucite, chrysotile, and mixtures thereof,
 and, without dehydrating the ground mass of mineral, mixing the ground mass with water,
 heating the mixture in an enclosed vessel until the pressure in the vessel is within the range of 400 to 800 p.s.i.g. and maintaining said mixture under said pressure for a time within the range of ½ to 12 hours.

5. A method for producing high surface area submicron size filler material from naturally occurring minerals which comprises:
 subjecting a dry mass of crystalline hydrated oxide mineral to dry grinding until the crystal structure of a substantial portion of said mass of mineral is destroyed, said mineral being selected from the group consisting of kaolinite, anauxite, dickite, nacrite, halloysite, gibbsite, brucite, chrysotile, and mixtures thereof,
 and subjecting the mass of mineral thus ground to the action of saturated steam at a pressure within the range of about 100 to about 3000 p.s.i.g. and for a time sufficient to reduce the water of crystallization of the ground mineral by an amount within the range of about 10% to about 60%.

6. The method of claim 5 in which said pressure is within the range of 400 to 800 p.s.i.g. and the time is within the range of ½ to 12 hours.

7. A method for producing a submicron size filler material which comprises:

dry grinding a dry mass of mineral, said mineral being in its naturally occurring hydrated crystalline state and being selected from the group consisting of kaolinite, anauxite, dickite, nacrite, halloysite, gibbsite, brucite, chrysotile and mixtures thereof, and continuing the grinding until the crystal structure of substantially all of said mass of mineral is destroyed.

mixing the ground mass with water, heating the aqueous mixture in an enclosed vessel until the pressure in the vessel is within the range of about 100 to about 3000 p.s.i.g. and maintaining said mixture under said pressure for a time within the range of from a few seconds to 24 hours, said time being sufficient to produce a material having a surface area of at least 100 m.²/g.

8. The method of claim 7 in which said pressure is within the range of 400 to 800 p.s.i.g. and the time is within the range of ½ to 12 hours.

References Cited by the Examiner
UNITED STATES PATENTS 1,275,705   8/1918   Laird _____ 106—72

OTHER REFERENCES

Dietzel et al., Rehydration of Metakaolin, Ber. deut. Ges., 34 (11) (1957) (as abstracted in ceramic abstracts, American Ceramic Society, August 1958, page 216).

TOBIAS E. LEVOW, *Primary Examiner.*